(12) United States Patent
Allerding et al.

(10) Patent No.: US 6,868,364 B2
(45) Date of Patent: Mar. 15, 2005

(54) METHOD FOR DETERMINING THE WEIGHT OF A LOAD UPON A LOAD SUPPORT MEANS OF A HYDRAULIC LIFTING DEVICE

(75) Inventors: Uwe Allerding, Embsen (DE); Sebastian Lehnart, Hamburg (DE)

(73) Assignee: Jungheinrich Aktiengesellschaft (DE)

( * ) Notice: Subject to any disclaimer, the term of this patent is extended or adjusted under 35 U.S.C. 154(b) by 0 days.

(21) Appl. No.: 10/730,517

(22) Filed: Dec. 8, 2003

(65) Prior Publication Data

US 2004/0133384 A1 Jul. 8, 2004

(30) Foreign Application Priority Data

Dec. 19, 2002 (DE) ............................... 102 59 470

(51) Int. Cl.⁷ ........................... G01G 19/14; G06F 15/00
(52) U.S. Cl. ..................................................... 702/174
(58) Field of Search ............................... 702/174, 173, 702/175, 114

(56) References Cited

U.S. PATENT DOCUMENTS

| | | | |
|---|---|---|---|
| 4,845,648 A | * | 7/1989 | Hagenbuch .................. 702/174 |
| 5,650,930 A | * | 7/1997 | Hagenbuch .................. 701/50 |
| 5,666,295 A | * | 9/1997 | Bruns ........................ 702/174 |
| 6,552,279 B1 | * | 4/2003 | Lueschow et al. .......... 177/141 |
| 6,627,825 B1 | * | 9/2003 | Creswick ..................... 177/141 |
| 2002/0111767 A1 | * | 8/2002 | Lueschow et al. .......... 702/175 |

FOREIGN PATENT DOCUMENTS

| | | |
|---|---|---|
| DE | 195 11 591 A1 | 10/1996 |
| DE | 101 46 421 A1 | 5/2002 |
| EP | 0 246 363 A1 | 11/1987 |

* cited by examiner

*Primary Examiner*—John Barlow
*Assistant Examiner*—Demetrius R. Pretlow
(74) *Attorney, Agent, or Firm*—Wall Marjama & Bilinski LLP

(57) ABSTRACT

A method for determining the weight of a load upon a load support of a hydraulic lifting device, in which the pressure of hydraulic fluid within a lifting cylinder is measured and a stored reference curve representing the relationship between the weight of the load and the hydraulic fluid pressure is determined by multiple measurements of the pressure resulting from loads of known weight and the reference curve. According to the method, the load support is lifted and lowered during a short period upon operator request or automatically to sense the load before and during load lifting and lowering operations and a plurality of pressure measuring values are obtained. A pair of average values of the pressure measuring values for respectively lifting and lowering is generated, as well as a third average value of the pair of average values. The third average value is then applied to the reference curve for determining the weight of the load.

3 Claims, 1 Drawing Sheet

METHOD FOR DETERMINING THE WEIGHT OF A LOAD UPON A LOAD SUPPORT MEANS OF A HYDRAULIC LIFTING DEVICE

FIELD OF THE INVENTION

The present invention relates to a method for determining the weight of a load upon a load support means of a hydraulic lifting device, in particular in an industrial truck.

BACKGROUND OF THE INVENTION

It has become known to sense the load upon a load support means of an industrial truck in order to determine operative parameters and dangerous situations and to determine the load for the operator. A simple possibility is to measure the pressure of the hydraulic fluid within the lifting cylinder of the lifting device. Various apparatus means such as weighing cells, strain gauges, etc. have become known for this purpose. These means, however, generally are not suited to compensate for temperature and aging dependent effects caused by variations of the viscosity of the hydraulic fluid and the friction of the lifting mechanics and the lifting cylinder. Accordingly, they generally provide for relatively inaccurate measurements.

DE 101 46 421 A1 discloses a method for compensating for variations of the viscosity for a load measuring system. The known method comprises determining a plurality of measuring values for a first load weight and a second load weight. When determining these measuring values also the temperature is measured. When a third load is being lifted, a further plurality of pressure measuring values and also the temperature are determined. The weight of the third load is determined from the first measuring values and the second measuring values, with the temperature being taken into consideration. In other words, the respective load weight is determined by means of a temperature dependent reference curve that had been determined for the first and second loads. This method is more precise than the above mentioned method; however, it does not take into consideration frictional effects. When the load is being lowered, friction forces act in the opposite direction, and the same is true for lifting operations; in both cases friction results in reduction of the pressure within the lifting cylinder.

SUMMARY OF THE INVENTION

It is an object of the present invention to provide a method for determining the weight of a load upon a load support means of a hydraulic lifting device, which method allows to obtain precise values of the load weight in a simple manner.

To meet this object, the present invention provides a method for determining the weight of a load upon a load support means of a hydraulic lifting device, in particular in an industrial truck, in which method the pressure of hydraulic fluid within a lifting cylinder is measured and a reference curve representing the relationship between the weight of the load and the pressure of the hydraulic fluid is determined by multiple measurements of the pressure resulting from loads of known weight and said reference curve is stored, said method comprising the following steps:

lifting and lowering said load support means during a short period upon request of an operator or by automatic means to sense the load before and during load lifting and lowering operations, obtaining a plurality of pressure measuring values while said load support means is being lifted and lowered during said short period, and generating a pair of average values of said pressure measuring values for lifting and, respectively, lowering, and generating a third average value of said pair of average values for lifting and, respectively, lowering and applying said third average value to said reference curve for determining the weight of the load.

The reference curve representing the relationship between the load weight and the pressure of the hydraulic fluid is obtained by multiple measurements of the fluid pressure for first and second loads of known weight. Since such relationship is substantially linear, the reference curve is a straight line which may be computed e.g. from the measurement values as a straight regression line. The reference curve obtained thereby is stored in a memory of a processor.

In the method of the invention a great number of pressure measuring values are obtained both during the brief lifting and lowering steps. The measuring values for the lifting step on the one hand and for the lowering step on the other hand are used to generate a pair of average values. The pair of average values is used to generate a third average value which is applied to the reference curve in order to determine the load weight.

During the lifting and lowering steps which may be performed during a relatively short period of a few seconds, a plurality of pressure measuring values are obtained. Since transient effects occur at the beginning of the lifting and lowering steps, the present invention preferably provides for suppression thereof and for obtaining the measuring values only after the transient phenomenon has been terminated. When for example the lowering or lifting step takes four seconds, the above mentioned multiple measurements are performed only during the last second.

Of course, the sequential order of the lifting and lowering steps for load sensing may be arbitrary.

In some lifting devices a plurality of lifting cylinders are operated either sequentially or simultaneously, e.g. in lift fork trucks of the free stroke and load stroke type. In these cases, the present invention preferably provides for determining and storing a reference curve or straight regression line for each of a plurality of basic loads.

DETAILED DESCRIPTION OF THE INVENTION

Figure 1A:
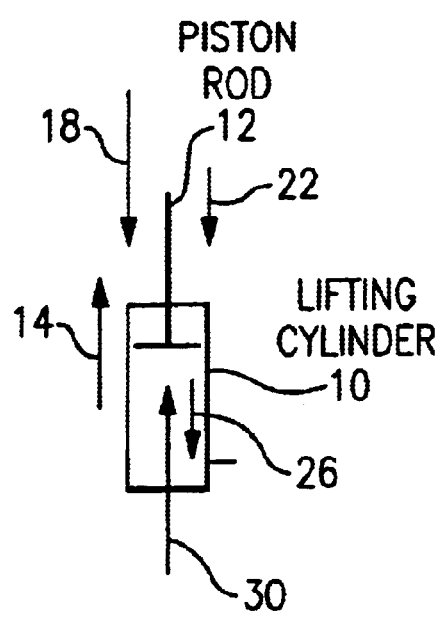
FIGS. 1a and 1b are schematic views of a lifting cylinder in accordance with the present invention during lifting and lowering operations, respectively.
Figure 1B:
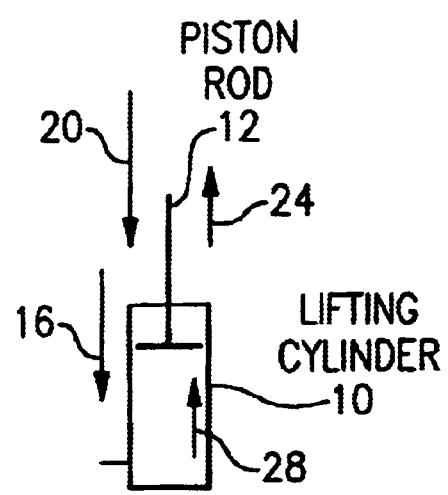

A lifting cylinder 10 operates, via a piston rod 12, a load support means (not shown) of e.g. a industrial truck (not shown). FIG. 1(a) represents a lifting operation, and the FIG. 1(b) represents a lowering operation. This is indicated by arrows 14 and 16, respectively. The arrows 18 and 20 indicate the forces resulting from the weight of a load resting upon the load support means. The arrows 22 and 24 indicate frictional forces occurring during the lifting and lowering operations. In both cases the frictional force acts in a direction opposite to the direction of movement of the piston. The friction of the hydraulic fluid has been indicated by the arrow 26 and, respectively, 28. The arrow 30 represents the lifting force.

As may be seen from the drawing viscosity and friction effects are compensated due to movements in opposite directions during the measuring cycle. Mechanical friction acting opposite to the direction of movement during the lifting operation results in a pressure increase during the lifting operation, FIG. 1(a). During the lowering operation friction acts in a direction opposite to the lowering direction and results in decrease of the pressure within the lifting cylinder. The same holds true for the viscosity. During the lifting operation oil must be pressed through associated conduits, and the fluid pressure within the lifting cylinder will be less for non-viscous oil than for viscous oil. During the lowering operation, however, the non-viscous oil is exhausted only slowly, and this will result in an increase of the fluid pressure within the lifting cylinder.

Control of the lifting and lowering operations may include a circuit member or software which automatically performs the above described method as soon as operation is initiated, e.g. for each new load. As an alternative, the cabin of the operator may include a switch which when actuated automatically causes the described load sensing method to be performed.

We claim:

1. A method for determining the weight of a load upon a load support means of a hydraulic lifting device, in particular in an industrial truck, in which method the pressure of hydraulic fluid within a lifting cylinder is measured and a reference curve representing the relationship between the weight of the load and the pressure of the hydraulic fluid is determined by multiple measurements of the pressure resulting from loads of known weight and said reference curve is stored, said method comprising the following steps:

lifting and lowering said load support means during a short period upon request of an operator or by automatic means to sense the load before and during load lifting and lowering operations, obtaining a plurality of pressure measuring values while said load support means is being lifted and lowered during said short period, and generating a pair of average values of said pressure measuring values for lifting and, respectively, lowering, and generating a third average value of said pair of average values for lifting and, respectively, lowering and applying said third average value to said reference curve for determining the weight of the load.

2. A method as defined in claim 1, wherein said multiple measurements are performed a predetermined period after initiating said lifting and lowering during said short period.

3. A method as defined in claim 1, wherein when there are varying basic loads a reference curve is determined and stored for each basic load.

* * * * *